United States Patent [19]
Smith et al.

[11] Patent Number: 5,898,459
[45] Date of Patent: Apr. 27, 1999

[54] MULTI-CAMERA PROGRAMMABLE PAN-AND-TILT APPARATUS

[75] Inventors: William V. Smith; Alfred M. Alperin, both of Memphis, Tenn.

[73] Assignee: Lectrolarm Custom Systems, Inc., Memphis, Tenn.

[21] Appl. No.: 08/992,854

[22] Filed: Dec. 18, 1997

Related U.S. Application Data

[63] Continuation-in-part of application No. 08/824,813, Mar. 26, 1997, abandoned.

[51] Int. Cl.$^6$ ........................................... H04N 7/18
[52] U.S. Cl. ..................... 348/219; 348/214; 348/211; 348/159; 348/169; 382/103
[58] Field of Search ...................... 348/15–16, 159, 348/211–213, 218–220, 357–358, 114, 208, 214, 219, 169, 143, 153; 382/103

[56] References Cited

U.S. PATENT DOCUMENTS

| | | | |
|---|---|---|---|
| 3,916,094 | 10/1975 | Marrone | 348/214 |
| 4,293,876 | 10/1981 | Williams | 348/217 |
| 4,321,625 | 3/1982 | Smith | 348/212 |
| 4,471,383 | 9/1984 | Shiono et al. | 358/228 |
| 4,566,036 | 1/1986 | Kadosawa | 348/213 |
| 4,581,647 | 4/1986 | Vye | 348/212 |
| 4,649,431 | 3/1987 | Terashi | 358/228 |
| 4,910,593 | 3/1990 | Weil | 348/164 |
| 4,974,088 | 11/1990 | Sasaki | 348/213 |
| 4,980,761 | 12/1990 | Natori | 348/15 |
| 5,434,617 | 7/1995 | Bianchi | 348/170 |
| 5,450,140 | 9/1995 | Washino | 348/722 |
| 5,471,296 | 11/1995 | Parker et al. | 356/139.06 |
| 5,473,364 | 12/1995 | Burt | 348/169 |
| 5,517,236 | 5/1996 | Sergeant et al. | 348/143 |
| 5,557,443 | 9/1996 | Nakamura et al. | 348/169 |
| 5,566,251 | 10/1996 | Hanna et al. | 348/590 |
| 5,583,565 | 12/1996 | Cortjens et al. | 348/213 |
| 5,589,875 | 12/1996 | Fujita et al. | 348/143 |

OTHER PUBLICATIONS

CoStar, CV–710 CCD Color Camera (date unknown).
Samsung Aerospace, SHC–410NAD Digital Signal Processing Color CCD Camera (date unknown).
Pelco, Model V55000 Series Sequential Switcher (Feb. 1995).
Panasonic Corporation, Electret Condenser Microphone Cartridge (date unknown).
National Semiconductor Corporation, LM124/LM224/LM324/LM224A/LM324/LM2902 Low Power Quad Operational Amplifiers (date unknown).

*Primary Examiner*—Bryan Tung
*Assistant Examiner*—Vu Le
*Attorney, Agent, or Firm*—Walker, McKenzie & Walker, P.C.

[57] ABSTRACT

A multi-camera programmable pan-and-tilt apparatus comprising a base and a camera mechanism having a first camera and a second camera, with the second camera including a zoom mechanism for varying the zoom magnification of the second camera. The apparatus further has a pan-and-tilt mechanism for moving the cameras with respect to the base, and a video switch receiving the video outputs of the cameras and selecting one for view. The first camera is viewed while the camera mechanism is moved from one scene to another and the second camera is viewed while the camera mechanism is not moving and is paused for observation of a scene. A programmable controller controls the camera mechanism and the pan-and-tilt mechanism, and, while the camera mechanism is moving from one scene to another and the output of the first camera is being viewed, causes the zoom magnification and focus of the second camera to become set to the desired zoom magnification and focus for the next scene position. The second camera may also have a motion sensor alarm for detecting viewed motion while the camera mechanism is paused at a given scene, and the detection of such motion can cause the camera mechanism to pause an additional time at the given scene and to alert the operator. A microphone may detect motion noise of the pan and tilt and cause the viewed video to switch from camera to camera in response to the motion noise.

14 Claims, 3 Drawing Sheets

MULTI-CAMERA PROGRAMMABLE PAN-AND-TILT APPARATUS

CROSS REFERENCE TO RELATED APPLICATIONS

This application is a continuation-in-part of U.S. patent application Ser. No. 08/824,813, filed Mar. 26, 1991, (now abandoned), hereby fully incorporated herein by reference.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention relates, in general, to surveillance equipment, and, in particular, to programmable pan-and-tilt camera surveillance apparatus.

2. Information Disclosure Statement

It is often desired to monitor a variety of locations or scenes using surveillance equipment. Well-known solutions for this problem include pan-and-tilt camera apparatus controlled from a remotely-located operator's console having a video monitor for viewing the scenes observed by the camera. The pan-and-tilt apparatus rotates ("pans") the camera about a typically vertical axis and also changes the azimuth of ("tilts") the camera to position the camera from scene to scene, and it is well-known to have programmable pan-and-tilt camera apparatus in which a sequence of pre-set viewing positions are sequentially viewed, with each pre-set viewing position having remembered pan, tilt, and magnification parameters set by the operator's panel.

It is important in the use of such surveillance equipment to be able to maximize the information conveyed by the equipment and observed by an operator. The operator needs to view the camera's output while the pan-and-tilt apparatus is moving the camera from one position to another, and the operator also needs to closely view the pre-set selected viewing positions at which activities, such as theft or undesired access, could occur that require surveillance.

Heretofore, pan-and-tilt surveillance apparatus would view a first pre-set scene location for a pre-set delay time, then move to a second pre-set scene location, change the zoom magnification and focus, and then view the second pre-set scene location for a second pre-set delay time. The zoom magnification of the camera from viewing the first scene is rarely, if ever, optimal for meaningful viewing of the larger scene as the camera is moved from the first pre-set scene location to the second pre-set scene location, and, upon reaching the second pre-set scene location, the operator must wait a significant time while the camera magnification is changed to the desired zoom magnification for the second pre-set scene location. This pattern repeats as the pan-and-tilt apparatus moves to third, fourth, etc., pre-set scene locations, and a significant portion of the possible surveillance time is wasted.

It is therefore desirable to have an improved pan-and-tilt camera apparatus that allows pre-set scenes to be viewed at desired focus and zoom magnification settings without delays for changing between one focus and zoom magnification setting to another, and also that allows the larger scene to be viewed at a wide-field focus and zoom magnification setting as the pan-and-tilt camera apparatus moves from one scene to another.

It is further desirable to have such an improved pan-and-tilt camera apparatus that pauses at each scene location when motion is detected.

A preliminary patentability search in Class 348, subclasses 212, 213, and 214, produced the following patents, some of which may be relevant to the present invention: Sergeant et al., U.S. Pat. No. 5,517,236, issued May 14, 1996; Washino, U.S. Pat. No. 5,450,140, issued Sept. 12, 1995; Natori, U.S. Pat. No. 4,980,761, issued Dec. 25, 1990; Vye, U.S. Pat. No. 4,581,647, issued Apr. 8, 1986; Kadosawa, U.S. Pat. No. 4,566,036, issued Jan. 21, 1986; Smith, U.S. Pat. No. 4,321,625, issued Mar. 23, 1982; Williams, U.S. Pat. No. 4,293,876, issued Oct. 6, 1981; and Marrone, U.S. Pat. No. 3,916,094, issued Oct. 28, 1975.

Sergeant et al., U.S. Pat. No. 5,517,236, describes a single-camera video surveillance system having a programmable pan-and-tilt mechanism and having preset focus and zoom settings. Washino, U.S. Pat. No. 5,450,140, describes a plurality of single-camera pan-and-tilt mechanisms controlled from a single operator's interface. Natori, U.S. Pat. No. 4,980,761, describes a single-camera pan-and-tilt mechanism in combination with a fixed and non-moving camera, with video signals being switchable from the two cameras. Vye, U.S. Pat. No. 4,581,647, describes a plurality of single-camera pan-and-tilt mechanisms controlled from a single operator's interface, in which the focus and zoom of each single-camera mechanism can be varied. Kadosawa, U.S. Pat. No. 4,566,036, describes a plurality of single-camera pan-and-tilt mechanisms controlled from a single remote control operator's interface. Smith, U.S. Pat. No. 4,321,625, describes a plurality of single-camera pan-and-tilt mechanisms controlled from a single remote control operator's interface. Williams, U.S. Pat. No. 4,293,876, discloses a dual-channel camera unit mounted on a single pan-and-tilt mechanism, one camera being a low-light camera and the other camera being a day-light camera, with both cameras having zoom and focus means. However, unlike the present invention, the Williams patent does not teach to have the unviewed camera's zoom and/or focus setting being changed while the output of the other camera is being viewed during motion of the pan-and-tilt mechanism, and only teaches switching between the two cameras under varying light level situations.

Additionally, the inventors are aware of Sasaki, U.S. Pat. No. 4,974,088, issued Nov. 27, 1990, which describes a single-camera programmable pan-and-tilt apparatus having programmable control means for controlling a single camera mounted upon a pan-and-tilt mechanism and also having a remote operator's panel in communication with the programmable control means.

Still further, the inventors are aware of various microphones, such as those sold under the trademark and tradename PANASONIC electret condenser microphone cartridge, that could be used with the present invention, as well as operational amplifiers, such as those sold under the trademark and tradename NATIONAL SEMICONDUCTOR LM324A low power quad operational amplifier, that would be suitable for constructing the circuitry of one embodiment of the present invention.

None of these references, either singly or in combination, disclose or suggest the present invention.

BRIEF SUMMARY OF THE INVENTION

The present invention is a multi-camera programmable pan-and-tilt apparatus, said apparatus comprising a base and a camera mechanism having a first camera and a second camera, with the second camera including zoom means for varying the zoom magnification of the second camera. The apparatus further comprises pan-and-tilt means for moving the camera mechanism with respect to the base, and video switching means, receiving the video outputs of the first and second cameras, for selectively choosing one of those video outputs for output as a third video output, in which the third video output is selected to be the output of the first camera while the pan-and-tilt means is moving the camera mechanism from one scene to another, and in which the third video output is selected to be the output of the second camera while the pan-and-tilt means is not moving and is paused for observation of a scene. A programmable control means controls the camera mechanism and the pan-and-tilt means, and, while the camera mechanism is moving from one scene to another and the output of the first camera is being viewed, causes the zoom magnification of the second camera to become set to the desired zoom magnification for the next scene position. The second camera may also have motion sensor alarm means for detecting viewed motion while the camera mechanism is paused at a given scene, and the detection of such motion can cause the camera mechanism to pause an additional time at the given scene and to alert the operator.

In a second preferred embodiment of the invention, the video switching means includes a microphone for detecting acoustic and/or vibration noise emitted by the pan and tilt means as the camera mechanism is moved, and the electrical signal generated by the microphone is used to cause the video switching means to selectively choose the viewed video signal to be from one camera or another.

DETAILED DESCRIPTION OF THE INVENTION

Figure 1:
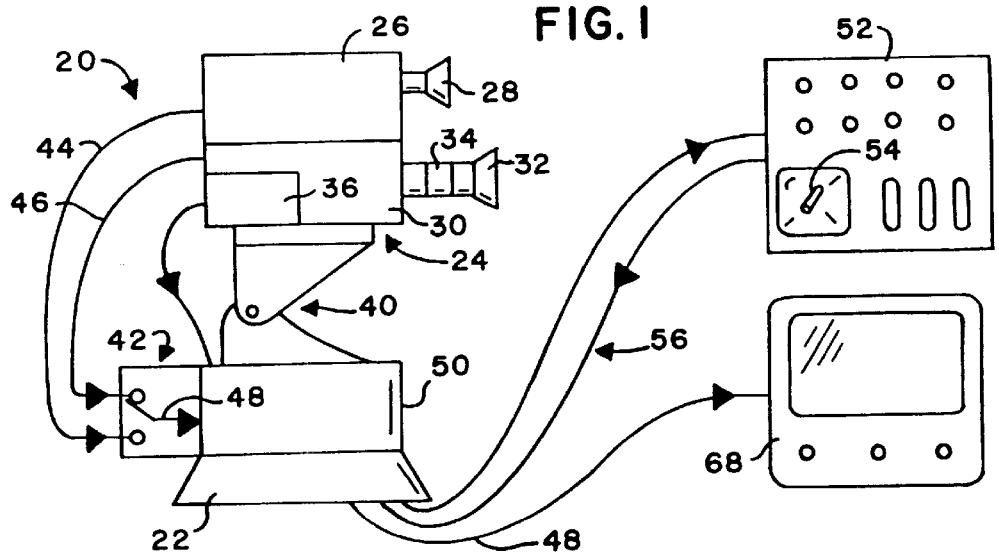
FIG. 1 is a schematic block diagram of the present invention.
Figure 2:
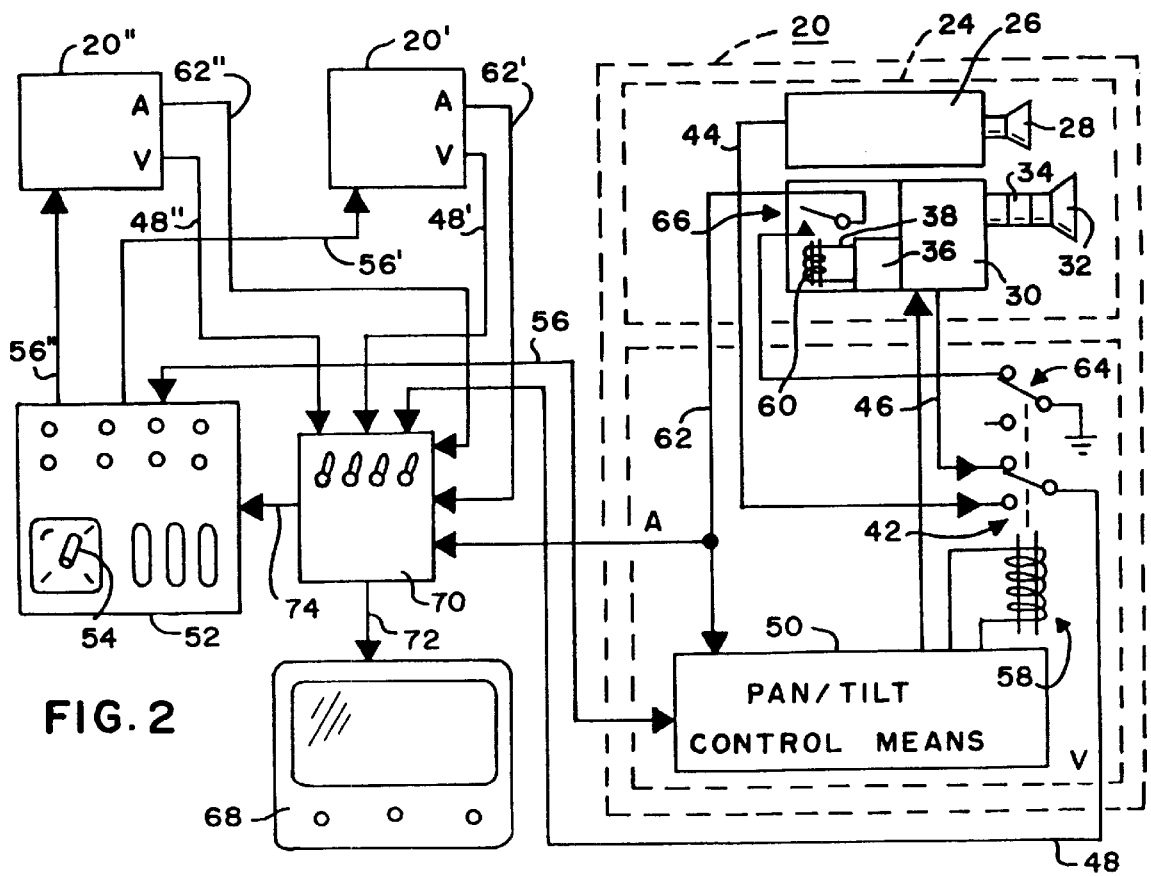
FIG. 2 is a detailed schematic block diagram of the present invention.

Referring to FIGS. 1 and 2, a multi-camera programmable pan-and-tilt apparatus 20 is shown. It shall be understood that there are many similarities between apparatus 20 and a well-known single-camera programmable pan-and-tilt apparatus such as the apparatus described in Sasaki, U.S. Pat. No. 4,974,088, issued Nov. 27, 1990, which patent is fully incorporated by reference herein. Only those specific details of the well-known prior art single-camera programmable pan-and-tilt apparatus that are necessary for an understanding of the present invention, together with those details of the specific improvements of the present invention, will be described hereinbelow.

Apparatus 20 includes a base 22 for mounting apparatus 20 to a surface, and apparatus 20 will often and preferably be inverted from the orientation shown in FIG. 1 with base 22 being mounted to a ceiling.

Apparatus 20 also includes a camera mechanism 24 including a well-known first camera 26, with first camera 26 preferably including a wide-angle fixed-magnification lens 28, and with camera mechanism 24 further including a well-known second camera 30, with second camera 30 including a variable magnification "zoom" lens 32 and further including well-known zoom means 34 for varying the view magnification of second camera 30. Second camera 30 preferably further includes well-known motion sensor alarm means 36 for asserting a motion alarm signal 38 when motion is detected in a scene viewed by second camera 30.

A suitable fixed magnification camera for use as first camera 26 is the Model CV-71ONDC camera made by CoStar U.S.A. Company, having an address of 40925 Country Center Drive, Suite 210, Temecula, Calif. 92591.

A suitable variable magnification camera with motion sensor alarm means for use as second camera 30 is the Model SHC-410NAD camera made by Samsung Opto-Electronics America, Inc., Closed Circuit Video Division, having an address of 40 Seaview Drive, Secaucus, N.J. 07094.

Apparatus 20 further includes pan-and-tilt means 40 for moving camera mechanism 24 with respect to base 22. Pan-and-tilt means 40 rotates ("pans") camera mechanism 24 about an axis, usually a vertical axis, in a manner well-known to those skilled in the art, and also adjusts the azimuth angle of ("tilts") camera mechanism 24. A suitable programmable pan-and-tilt mechanism for inclusion within pan-and-tilt means 40 is that described in Sasaki, U.S. Pat. No. 4,974,088, issued Nov. 27, 1990, fully included by reference herein. Well-known motors within pan-and-tilt means 40 cause camera mechanism 24 to pan from one scene to another and to tilt from one azimuth angle to another within a well-known bearing mounting.

Apparatus 20 includes video switching means 42, receiving the first video output 44 from first camera 26 and second video output 46 of second camera 30, for selectively choosing one of first 44 and second 46 video outputs for output as a third video output 48 at output "V" of apparatus 20. Video switching means 42 selects, in a manner hereinafter described, third video output 48 to be first video output 44 from first camera 26 while pan-and-tilt means 40 is moving camera mechanism 24 from one pre-set selected view position to another, and video switching means 42 selects third video output 48 to be second video output 46 while pan-and-tilt means 40 is not moving camera mechanism 24 from one pre-set selected view position to another.

Apparatus 20 further includes programmable control means 50 for controlling camera mechanism 24 and pan-and-tilt means 40. Programmable control means 50, like the programmable control means described in Sasaki, U.S. Pat. No. 4,974,088, preferably includes a well-known programmable microprocessor having a stored program in well-known read-only memory ("ROM") and having a well-known random-access memory ("RAM") for storage of various program parameters. Like the programmable control means described in Sasaki, a set of data parameters corresponding to the azimuth and rotation ("pan and tilt") setting for a plurality of pre-set selected view positions is stored in the RAM of control means 50, together with zoom magnification settings and focus settings for second camera 30 for each of the pre-set selected view positions, and these pre-set settings can be programmably pre-set using a remote operator's panel 52 in a well-known manner such as that described in the Sasaki patent. For example, an operator could use well-known "joystick" 54 on operator's panel 52 to alter the azimuth and rotation of camera mechanism 24 and then use the various switches and buttons on operator's panel 52 to adjust the zoom magnification and focus of camera 30 for the chosen scene in a manner well-known to those skilled in the art, and then cause those settings to be saved within the RAM of control means 50 as pre-set settings for the selected view position by appropriate manipulation of the buttons and switches on operator's panel 52. If desired, the operator could also similarly enter a pre-selected viewing delay, also stored in the RAM for control means 50, for each view position, and then cause control means 50 to sequence through the series of various pre-set selected view positions, pausing at each view position for the given pre-set viewing delay. As described in the Sasaki patent, command signals preferably pass between the operator's panel 52 and control means 50 over wires 56 using well-known RS-232 signal levels and a serialized stream of data.

Programmable control means 50 preferably includes a double-pole, double-throw ("DPDT") "motion-in-progress" relay 58 that is energized whenever pan-and-tilt means 40 is caused to have camera mechanism 24 in motion and that is de-energized (as shown in FIG. 2) whenever pan-and-tilt means 40 is not in motion. One set of contacts on relay 58 is used to function as video switching means 42 so that second video output 46 from second camera 30 is passed as third video output 48 when pan-and-tilt means 40 is not moving camera mechanism 24 and so that first video output 44 from first camera 26 is passed as third video output 48 when pan-and-tilt means 40 is moving camera mechanism 24.

A single-pole single-throw ("SPST") "motion-detected" relay 60 is preferably provided and is energized by assertion of the motion alarm signal 38 from motion sensor alarm means 36. This relay 60 interacts with motion-in-progress relay 58, in a manner hereinafter described, to generate a gated alarm signal 62 at output "A" of apparatus 20.

A second set of contacts 64 on relay 58 act together with contacts 66 on relay 60 as alarm gating means for groundedly asserting a gated alarm signal 62 only when both motion alarm signal 38 is asserted and camera mechanism 24 is not moving. The serial interconnection of contacts 64 with contacts 66 on relay 60 causes gated alarm signal 62 to be asserted to ground only when motion alarm signal 38 is asserted with a voltage that causes relay 60 to be energized simultaneous with motion-in-progress relay 58 being de-energized at the same time.

While moving from one pre-selected view position to another, programmable control means 50 causes the zoom means 34 of second camera 30 to change from the zoom magnification setting associated with the first and just-viewed view position to the zoom magnification setting associated with the second and soon-to-be viewed view position then being approached. Similarly, and if required, programmable control means 50 also preferably causes the focus setting of second camera 30 to change from the focus setting associated with the first and just-viewed view position to the focus setting associated with the second and soon-to-be viewed view position then being approached. While the camera mechanism 24 is thus moving and the focus and/or zoom settings are being altered, motion-in-progress relay 58 will be energized by programmable control means 50, thereby causing the video output of first camera 26 to be supplied as third video output 48 and also causing motion alarms to be inhibited on gated alarm signal 62. Once the second view position is reached, and after any zoom and/or focus adjustments have been completed and have stabilized, as, for example, by waiting a predetermined settling delay, then programmable control means 50 will de-energize motion-in-progress relay 58 so as to switch the video signal on third video output 48 to be the second video output 46 of second camera 30 and so as to enable the gated alarm signal 62 to be groundedly asserted only if the motion alarm signal 38 from second camera 30 is causing motion-detected relay 60 to be energized.

Figure 3:
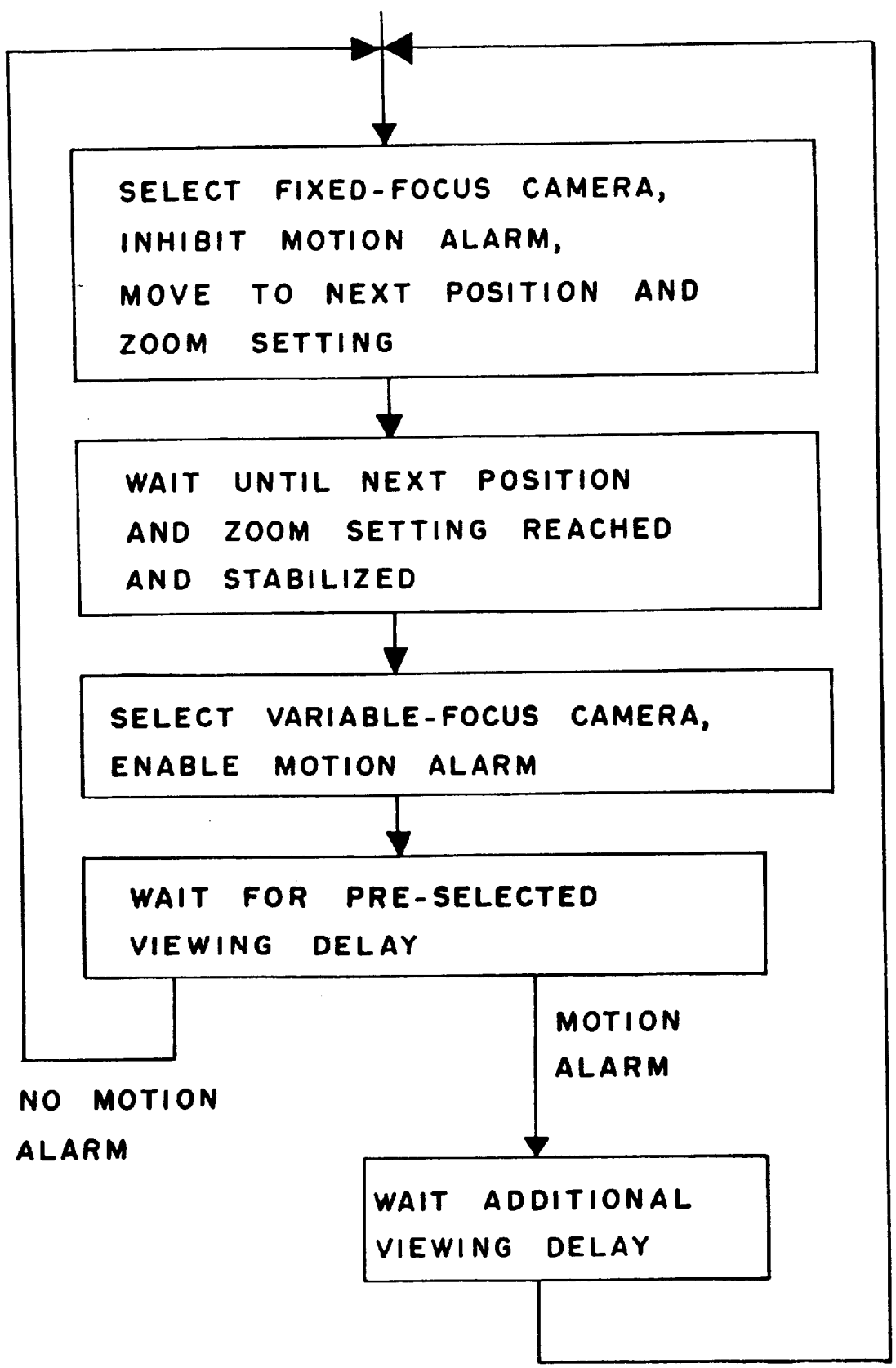
FIG. 3 is a partial flow chart describing the operation of the present invention.

As shown in FIG. 3, the operation of programmable control means 50 can now be described.

After a particular pre-set selected view position has been viewed by camera mechanism 24, control means 50 then energizes motion-in-progress relay 58, thereby causing first video output 44 of fixed-focus first camera 26 to be selected by video switching means 42 for viewing as third video output 48 and further causing motion alarms to be inhibited from assertion on gated alarm signal 62 by alarm gating means 64. Control means 50 then causes pan-and-tilt means 40 to move camera mechanism 24 to the next pre-set selected view position, and simultaneously causes the zoom magnification setting of zoom means 34 to be changed to the desired zoom setting of second camera 30 for the next pre-set selected view position and, if needed, also causes the focus of second camera 30 to be adjusted for the next pre-set selected view position. Control means 50 then waits until pan-and-tilt means 40 has successfully moved camera mechanism 24 to the next pre-set selected view position and also waits until the desired zoom and focus settings of second camera 30 have been reached and have stabilized, and then control means 50 de-energizes motion-in-progress relay 58, thereby selecting the second video output 46 of second camera 30 through video switching means 42 for viewing as third video output 48, and also enabling the assertion of gated alarm signal 62 if and when motion is detected by the motion sensing means 36 of second camera 30. Control means 50 then pauses at the current pre-set selected view position for the pre-set selected view delay period. If no gated alarm signal 62 assertion is detected during this pre-set selected view delay period, then the cycle will repeat and control means 50 will initiate motion to the next pre-set selected view position. If, however, gated alarm signal 62 becomes asserted during this pre-set selected view delay period, then control means 50 will pause an additional, programmable and pre-set viewing delay period, typically one to sixty additional seconds, provided that the operator of remote operator's panel 52 does not otherwise intervene. At the conclusion of this addition viewing delay period, the control means 50 will then resume its cycle and move to the next pre-set selected view position. By such operation, the operator's viewing time will be focused on those potentially significant events and activity surrounding the monitored pre-set selected view positions.

The third video output 48 of apparatus 20 is preferably supplied to a well-known video monitor 68 for viewing by the operator of the appropriately-selected camera output of apparatus 20. It should also be understood that additional monitors 68 may be used, with each monitor being separately attached to each camera on camera mechanism 24, should it be desired to view the output of both cameras simultaneously.

Referring again to FIG. 2, a plurality of multi-camera programmable pan-and-tilt apparatus may be used in combination, all being preferably controlled from the same operator's panel 52 and viewed from the same video monitor 68. It shall be understood that each one of the plurality of multi-camera programmable pan-and-tilt apparatus are substantially the same, with like elements of additional apparatus, e.g., apparatus 20' and 20", that are similar to apparatus 20, hereinbefore described, being indicated by prime marks ("'") appended to the reference numerals heretofore used with apparatus 20.

When used with such a plurality of multi-camera programmable pan-and-tilt apparatus, there is also preferably provided, in combination therewith, a well-known alarm switching means 70, hereinafter described, interposed between apparatus 20, 20', 20" and monitor 68 and operator's panel 52 when multiple apparatus 20, 20', 20" are to be viewed on the same monitor 68 and controlled from the same operator's panel 52.

Well-known alarm switching means 70 receives the third video outputs 48, 48', and 48" respectively from apparatus 20, 20', 20" and also receives the gated alarm signals 62, 62', and 62" respectively from apparatus 20, 20', 20" and is responsive to the received gated alarm signals, and is for selectively choosing one of the received third video outputs 48, 48', or 48" to be a fourth video output 72 upon assertion of one of the received gated alarm signals 62, 62', or 62", with the fourth video output 72 being selected to be the third video output 48, 48', or 48" from which an asserted received gated alarm signal 62, 62', or 62" is received. If more than one gated alarm signal 62, 62', or 62" is received, indicating a motion alarm at more than one apparatus 20, 20', or 20", then alarm switching means 70 preferably will sequence fourth video output 72 between all alarming apparatus 20, 20', or 20", at a sequencing rate of a second or two at each alarming video output, for viewing by the operator on monitor 68. It should be understood that, although only three apparatus 20, 20', and 20" are shown connected to alarm switching means 70, there could be more such apparatus simultaneously monitored and viewed from a single operator's panel 52 and monitor 68, with the provision of additional inputs on alarm switching means 70 for receiving additional video signals and alarm inputs.

Alarm switching means 70 preferably also generates a composite alarm signal 74 for alerting the operator that one of the apparatus 20, 20', or 20" is generating a motion alarm and for activating auxiliary surveillance equipment such as a well-known video cassette recorder ("VCR") for preserving a record of the viewed suspected improper activity.

A suitable alarm switching means for use with the present invention is the Model VS5004 Series Sequential Switcher (for monitoring four pan-and-tilt apparatus) or the Model VS5008 Series Sequential Switcher (for monitoring eight pan-and-tilt apparatus), each manufactured by Pelco Electronics, having an address of 300 West Pontiac Way, Clovis, Calif. 93612-5699. These switchers will automatically switch and "hold" on an alarmed input, and will generate the composite alarm signal 74 only as long as an alarm condition is received.

To use the present invention, an operator would decide on the target areas of interest and then program apparatus 20 (and apparatus 20' and 20", if more than one apparatus is used) to sequence through a number of pre-set selected view positions, using the operator's panel 52 to specify the pan-and-tilt setting, focus, and zoom magnification of camera mechanism 24 for each pre-set selected view position, in a manner heretofore described. The operator would then cause the programmable control means 50 to cycle through the pre-set selected view positions, and, when motion is detected at any of those view positions, the operator would then be alerted by an appropriate alarm signal and the apparatus 20 would pause an additional delay at the current position with the detected motion.

Figure 4:
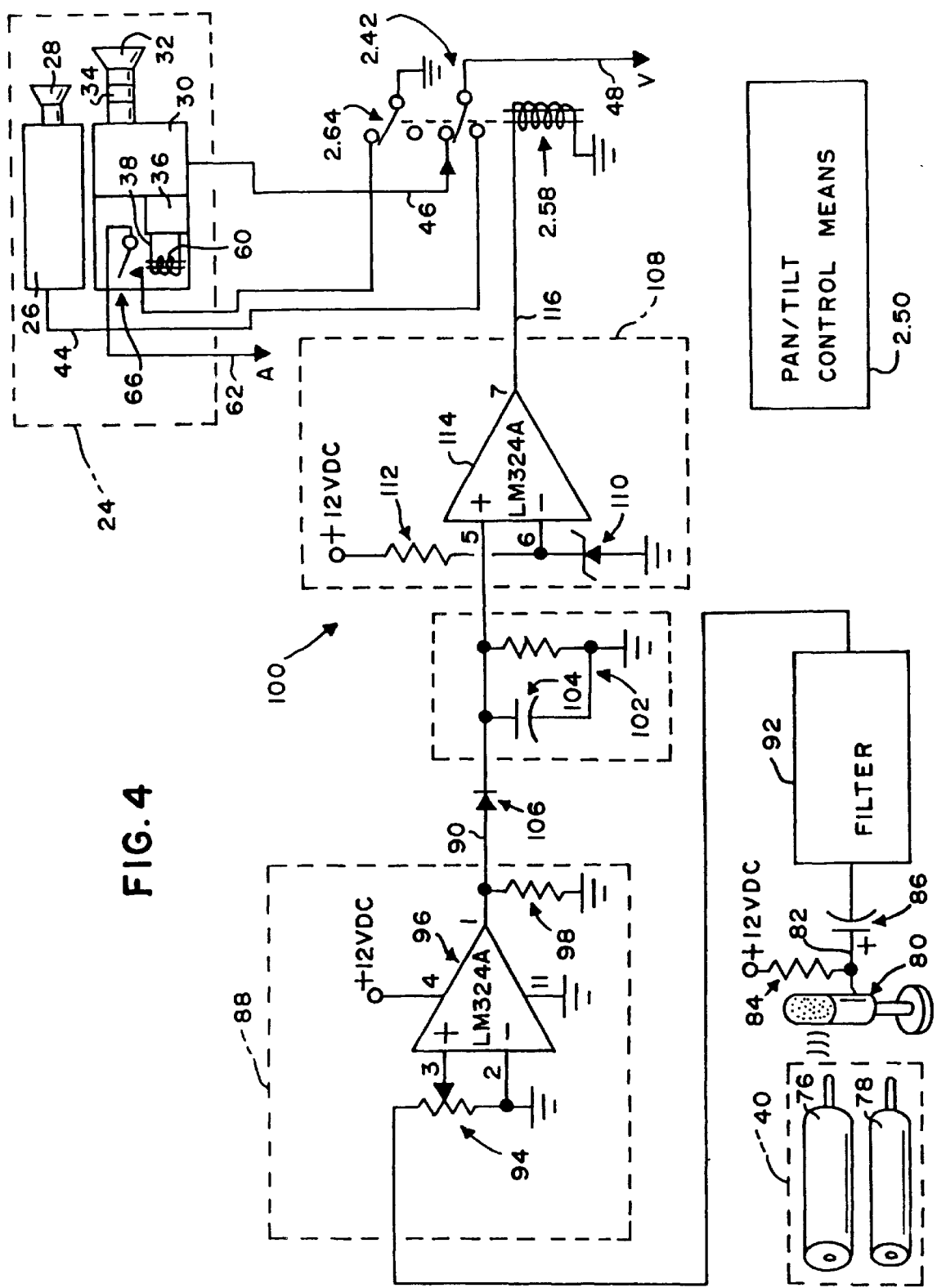
FIG. 4 is a schematic of a portion of the second embodiment of the present invention.

A second embodiment variation of the first preferred embodiment is shown in FIG. 4, omitting, for clarity, some parts of the first embodiment hereinbefore described in detail. Identifying reference designators for this second embodiment are marked similarly to the first embodiment, except for the prefix "2.". It shall be understood that many aspects of the two embodiments are substantially the same, and only the differences will be treated in detail, it being understood that similar features of the two embodiments perform similar functions.

The substantial difference between the first and second embodiments is that some pan and tilt control means, e.g., the pan-and-tilt control means 2.50 of the second embodiment shown in FIG. 4, do not readily provide a "motion in progress" relay (e.g., relay 58 of the first embodiment shown in FIG. 2) that is energized whenever the pan-and-tilt means is caused to have the camera mechanism in motion. To accommodate such pan-and-tilt control means as pan-and-tilt control means 2.50 lacking a "motion in progress" relay, the variation of the second embodiment is provided.

In this second embodiment shown in FIG. 4, camera mechanism 24 is the same as in the first embodiment. The pan-and-tilt means, shown diagrammatically as 40, typically has one or more well-known motors 76, 78, often stepper motors, for moving (panning and tilting, etc.) camera mechanism 24. As motors 76 and 78 operate to move the camera mechanism, they, or the gearing mechanisms to which they are operably coupled, emit a certain well-known acoustical/vibration noise. Likewise, when the motors are not moving the camera mechanism, they are substantially silent.

The video switching means 2.42 of the second embodiment includes microphone means 80, for detecting the certain noise emitted by pan-and-tilt means 40 and for generating an electrical signal 82 representative of that noise. As hereinafter described, electrical signal 82 operably causes relay 2.58 to be energized when the certain noise is detected, and preferably for a delay period thereafter, so as to create a "motion in progress" relay 2.58 that functions similarly to the motion in progress relay 58 of the first embodiment.

Microphone means 80 is preferably a well-known electret condenser microphone cartridge such as those sold under the trademark PANASONIC and having a high voltage internal electret membrane, a metal electrode and a Field Effect Transistor ("FET") and not requiring an external high-voltage bias. Resistor 84, preferably a 2.2K ohm resistor, applies a 12 Volt bias to the microphone means 80, and electrical signal 82 is then "AC coupled" through capacitor 86, preferably a 0.47 microfarad capacitor, to amplifier means 88 for generating a charging voltage 90, hereinafter described.

Interposed between amplifier means 88 and microphone means 80 may be a well-known electrical bandpass filter 92 for rejecting ambient background noise and other acoustic noise received by microphone means 80 that are dissimilar to the certain specific motor noise of motors 76, 78, and bandpass filter 92 is for passing the certain specific motor noise of pan-and-tilt motors 76, 78 emitted during the moving of camera mechanism 24. If filtering by bandpass filter 92 is not required, then bandpass filter 92 may simply be omitted by replacing it with a wire, so as to pass all frequencies from microphone means 80 through capacitor 86 to amplifier means 88.

Amplifier means 88 operates "open loop", having a 10K ohm input gain control potentiometer 94 feeding the differential inputs to an operational amplifier 96, such as the well-known LM324A operational amplifier made by National Semiconductor, and operational amplifier 96 has a 5.6K ohm load resistor 98 attached between its output and ground. It will be understood that, because amplifier means 88 operates "open loop", when the certain noise of pan and tilt means 40 is detected by microphone means 80, the output charging voltage 90 will rise to the positive power supply voltage (here, +12 volts DC), and that when the certain noise of pan and tilt means 40 is not detected, the output charging voltage 90 will fall substantially to the lower power supply voltage (here, ground or zero volts DC), thereby causing charging voltage 90 to represent a "motion present" signal.

Interposed between relay 2.58 and the output of amplifier means 88 is preferably a delay means 100 for "stretching" the "motion present" signal, i.e., charging voltage 90, for driving relay 2.58 and delaying, for a certain predetermined delay period, the deassertion (return to ground) of the motion present signal after the detected certain noise (i.e., motion noise) ceases, thereby causing relay 2.58 to indicate "motion present" and to select the first video output 44 for viewing not only while motion is truly present, but also for the certain predetermined delay period after motion ceases. This delay, which is caused in a manner hereinafter described, allows time for the camera mechanism to stabilize after motion before switching the viewed video, and also causes the alarm gating means contacts 2.64 of relay 2.58 to inhibit the generation of motion alarms until the camera motion has stabilized, just as hereinbefore described for the similar alarm gating means contacts 64 of the first embodiment.

Delay means 100 includes a resistor 102 and capacitor 104 connected in parallel so as to have a predetermined time constant for the delay. Resistor 102 is preferably a 75K ohm resistor and capacitor 104 is preferably a 10 microfarad capacitor, and the delay can be increased by increasing the value of resistor 102 and/or by increasing the value of capacitor 104, thereby increasing the RC time constant in a manner well-known to those skilled in the art. Likewise, the delay can be decreased by decreasing the value of resistor 102 and/or the value of capacitor 104.

Charging diode 106 allows charging voltage 90 to quickly charge capacitor 104 when the charging voltage 90 is asserted and rises to the positive power supply voltage as the certain noise of motion is detected, and then decouples the charging voltage from resistor 102 and capacitor 104 when the charging voltage is deasserted and falls to ground as the certain noise of motion ceases to be detected, thereby allowing resistor 102 to discharge capacitor 104 at the rate of the RC time constant.

Following the parallel resistor 102 and capacitor 104 is a threshold detector 106 that detects whether the voltage across capacitor 104 is greater than or less than a certain threshold, here chosen to be 4 volts as set by 4 volt zener diode 110 biased to the positive power supply voltage by 10K ohm resistor 112. Operational amplifier 114, preferably a LM324A operational amplifier, is configured as a comparator, with one of its differential inputs sensing the voltage across capacitor 104 and with the other of its differential inputs sensing the 4 volts across zener diode 110, thereby causing relay driving voltage 116 to be asserted to the positive supply voltage when motion is present (as detected by the presence of the motion noise emitted from pan and tilt means 40) and also for the delay period after motion ceases.

Thus, "motion is present" relay 2.58 can be provided using the second embodiment of the present invention, even when the pan and tilt means does not provide such a relay. One set of contacts (2.64) on relay 2.58 can be used to inhibit the generation of motion alarms during movement of the camera mechanism and during the settling period thereafter. Another set of contacts on relay 2.58 can switch between the two cameras, as was the case in the first embodiment.

By adding another set of contacts (not shown) to relay 2.58, the automatic iris adjustment circuit on the cameras could be disabled, as will now be described, thereby increasing the useful life of the cameras and reducing maintenance.

Camera mechanisms are well-known that have automatic iris adjustment circuitry, typically with stepper motors and the like for adjusting the iris of the camera to compensate for changing light conditions viewed by the camera. It has been found by the inventors that, in a pan-and-tilt surveillance camera, this automatic iris adjustment is frequently and almost continuously in operation as the camera moves from scene to scene, causing the mechanical iris mechanism to be subjected to great wear and tear, thereby reducing the life expectancy of the camera and causing frequent maintenance and repair. It has also been found by the inventors that the well-known Automatic Gain Control ("AGC") circuits within such cameras can compensate adequately for an iris that is slightly out of adjustment. Because ambient light within a monitored area is typically quite stable, satisfactory pictures can still be obtained from the camera if the iris adjustment mechanism is not always operating.

Therefore, relay 2.58 may also be provided with another set of contacts, not shown, for selectively gating the power to the automatic iris adjustment circuitry within the cameras, applying power to the iris adjustment circuitry when the cameras are not in motion and removing power from the iris adjustment circuitry when the cameras are in motion, thereby inhibiting operation of the iris adjustment circuitry and mechanism when the cameras are moving. Such an approach increases the life expectancy of the camera and decreases the frequency of maintenance and repair to the camera.

As a further benefit of the second preferred embodiment, an indicator light or other indicator means may be attached to relay driving voltage 116 so that the human operator could be alerted, for example by the continuous actuation of the indicator means, that the motors in the camera were operating continuously, as could happen in the event that a malfunction of the pan-and-tilt control means occurs.

It should also be understood that the microphone means of the second embodiment of the present invention could also detect noise from motors operating the zoom lens of one of the cameras, i.e., not just the noise from the pan-and-tilt means itself, and such noise of the zoom mechanism could also properly cause the second embodiment to inhibit the generation of "motion alarms"and to cause the selected video signal to be that from the fixed-lens camera.

To use the second embodiment, the microphone means, whether a conventional microphone or a vibration sensor, should be attached to the camera mechanism, the pan and tilt mechanism, or the zoom lens mechanism, as desired, so that the microphone is acoustically coupled to the desired emitted noise. Otherwise, use and operation of the second embodiment is similar to that of the first embodiment, hereinbefore described.

The use of both embodiments of the present invention allows multi-site supervision of pre-set selected target areas, giving an operator the ability to control the size of the scene being monitored by setting the zoom magnification for each viewed target area, thereby greatly reducing false and nuisance alarms by essentially ignoring activity surrounding the area of interest.

Although the present invention has been described and illustrated with respect to a preferred embodiment and a preferred use therefor, it is not to be so limited since modifications and changes can be made therein which are within the full intended scope of the invention.

We claim:

1. A multi-camera programmable pan-and-tilt apparatus, said apparatus comprising:

(a) a base;
   (b) a camera mechanism, said camera mechanism comprising:
      i. a first camera having a first video output; and
      ii. a second camera having a second video output and having a zoom magnification; said second camera including zoom means for varying the zoom magnification of said second camera;
   (c) pan-and-tilt means for moving said camera mechanism with respect to said base so that both said first said second cameras move in tandem;
   (d) video switching means, receiving said first and said second video outputs, for selectively choosing one of said first and said second video outputs for output as a third video output; said third video output being selected by said video switching means to be said first video output while said pan-and-tilt means is moving said camera mechanism, and said third video output being selected by said video switching means to be said second video output while said pan-and-tilt means is not moving said camera mechanism; and
   (e) programmable control means for controlling said camera mechanism and said pan-and-tilt means; said control means having a plurality of programmably pre-set selected view positions; said zoom means being responsive to said control means.

2. The apparatus as recited in claim 1, in which each one of said plurality of pre-set selected view positions has a pre-set selected zoom magnification setting of said zoom means associated therewith; and, as said camera mechanism is moving from a first view position of said plurality of pre-set selected view positions to a second view position of said plurality of pre-set selected view positions, said control means causes said zoom means to change from a first zoom magnification setting associated with said first view position to a second zoom magnification setting associated with said second view position.

3. A multi-camera programmable pan-and-tilt apparatus, said apparatus comprising:

(a) a base;
   (b) a camera mechanism, said camera mechanism comprising:
      i. a first camera having a first video output; and
      ii. a second camera having a second video output and having a zoom magnification; said second camera including zoom means for varying the zoom magnification of said second camera; said second camera including motion sensor alarm means for asserting a motion alarm signal when motion is detected in a scene viewed by said second camera;
   (c) alarm gating means for asserting a gated alarm signal only when both said motion alarm signal is asserted and said camera mechanism is not moving;
   (d) pan-and-tilt means for moving said camera mechanism with respect to said base;
   (e) video switching means, receiving said first and said second video outputs, for selectively choosing one of said first and said second video outputs for output as a third video output; said third video output being selected by said video switching means to be said first video output while said pan-and-tilt means is moving said camera mechanism, and said third video output being selected by said video switching means to be said second video output while said pan-and-tilt means is not moving said camera mechanism; and
   (f) programmable control means for controlling said camera mechanism and said pan-and-tilt means; said control means having a plurality of programmably pre-set selected view positions each one of said plurality of pre-set selected view positions having a pre-set selected zoom magnification setting of said zoom means associated therewith; and, as said camera mechanism is moving from a first view position of said plurality of pre-set selected view positions to a second view position of said plurality of pre-set selected view positions, said control means causes said zoom means to change from a first zoom magnification setting associated with said first view position to a second zoom magnification setting associated with said second view position; said zoom means being responsive to said control means.

4. The apparatus as recited in claim 3, in which each one of said plurality of pre-set selected view positions has a pre-set selected view delay period associated therewith during which said control means causes said pan-and-tilt means to pause at each respective said one of said pre-set selected view positions; and, if said gated alarm signal is asserted during said pre-set selected view delay period, then said control means causes said pan-and-tilt means to pause at its current view position for an additional viewing delay period.

5. A multi-camera programmable pan-and-tilt apparatus, said apparatus comprising:

(a) a base;
   (b) a camera mechanism, said camera mechanism comprising:
      i. a first camera having a first video output; and
      ii. a second camera having a second video output and having a zoom magnification; said second camera including zoom means for varying the zoom magnification of said second camera; said second camera including motion sensor alarm means for asserting a motion alarm signal when motion is detected in a scene viewed by said second camera;
   (c) alarm gating means for asserting a gated alarm signal only when both said motion alarm signal is asserted and said camera mechanism is not moving;
   (d) pan-and-tilt means for moving said camera mechanism with respect to said base;
   (e) video switching means, receiving said first and said second video outputs, for selectively choosing one of said first and said second video outputs for output as a third video output; said third video output being selected by said video switching means to be said first video output while said pan-and-tilt means is moving said camera mechanism, and said third video output being selected by said video switching means to be said second video output while said pan-and-tilt means is not moving said camera mechanism; and
   (f) programmable control means for controlling said camera mechanism and said pan-and-tilt means; said control means having a plurality of programmably pre-set selected view positions; said zoom means being responsive to said control means.

6. The apparatus as recited in claim 5, in which each one of said plurality of pre-set selected view positions has a pre-set selected view delay period associated therewith during which said control means causes said pan-and-tilt means to pause at each respective said one of said pre-set selected view positions; and, if said gated alarm signal is asserted during said pre-set selected view delay period, then said control means causes said pan-and-tilt means to pause at its current view position for an additional viewing delay period.

7. In combination,
(A) a plurality of multi-camera programmable pan-and-tilt apparatus, each said apparatus comprising:
  (a) a base;
  (b) a camera mechanism, said camera mechanism comprising:
    i. a first camera having a first video output; and
    ii. a second camera having a second video output and having a zoom magnification; said second camera including zoom means for varying the zoom magnification of said second camera; said second camera further including motion sensor alarm means for asserting a motion alarm signal when motion is detected in a scene viewed by said second camera;
  (c) pan-and-tilt means for moving said camera mechanism with respect to said base;
  (d) video switching means, receiving said first and said second video outputs, for selectively choosing one of said first and said second video outputs for output as a third video output; said third video output being selected by said video switching means to be said first video output while said pan-and-tilt means is moving said camera mechanism, and said third video output being selected by said video switching means to be said second video output while said pan-and-tilt means is not moving said camera mechanism; and
  (e) programmable control means for controlling said camera mechanism and said pan-and-tilt means; said control means having a plurality of programmably pre-set selected view positions; said zoom means being responsive to said control means; and
  (f) alarm gating means for asserting a gated alarm signal only when both said motion alarm signal is asserted and said camera mechanism is not moving; and
(B) alarm switching means, receiving said third video output and said gated alarm signal from each said apparatus off said plurality of multi-camera programmable pan-and-tilt apparatus and responsive to said received gated alarm signals, for selectively choosing one of said received third video outputs to be a fourth video output upon assertion of one of said received gated alarm signals, said fourth video output being selected by said alarm switching means to be said third video output from the same apparatus as from which said asserted one of said received gated alarm signals is received.

8. The combination as recited in claim 7 in which, for each apparatus of said plurality of multi-camera programmable pan-and-tilt apparatus:
  each one of said plurality of pre-set selected view positions has a pre-set selected zoom magnification setting of said zoom means associated therewith; and, as said camera mechanism is moving from a first view position of said plurality of pre-set selected view positions to a second view position of said plurality of pre-set selected view positions, said control means causes said zoom means to change from a first zoom magnification setting associated with said first view position to a second zoom magnification setting associated with said second view position.

9. The combination as recited in claim 8 in which, for each apparatus of said plurality of multi-camera programmable pan-and-tilt apparatus:
  each one of said plurality of pre-set selected view positions has a pre-set selected view delay period associated therewith during which said control means causes said pan-and-tilt means to pause at each respective said one of said pre-set selected view positions; and, if said gated alarm signal is asserted during said pre-set selected view delay period, then said control means causes said pan-and-tilt means to pause at its current view position for an additional viewing delay period.

10. The combination as recited in claim 7 in which, for each apparatus of said plurality of multi-camera programmable pan-and-tilt apparatus:
  each one of said plurality of pre-set selected view positions has a pre-set selected view delay period associated therewith during which said control means causes said pan-and-tilt means to pause at each respective said one of said pre-set selected view positions; and, if said gated alarm signal is asserted during said pre-set selected view delay period, then said control means causes said pan-and-tilt means to pause at its current view position for an additional viewing delay period.

11. A multi-camera programmable pan-and-tilt apparatus, said apparatus comprising:
  (a) a base;
  (b) a camera mechanism, said camera mechanism comprising:
    i. a first camera having a first video output; and
    ii. a second camera having a second video output and having a zoom magnification; said second camera including zoom means for varying the zoom magnification of said second camera;
  (c) pan-and-tilt means for moving said camera mechanism with respect to said base;
  (d) video switching means, receiving said first and said second video outputs, for selectively choosing one of said first and said second video outputs for output as a third video output; said third video output being selected by said video switching means to be said first video output while said pan-and-tilt means is moving said camera mechanism, and said third video output being selected by said video switching means to be said second video output while said pan-and-tilt means is not moving said camera mechanism; and
  (e) programmable control means for controlling said camera mechanism and said pan-and-tilt means; said control means having a plurality of programmably pre-set selected view positions; said zoom means being responsive to said control means;
said pan and tilt means emitting a certain noise only while said pan and tilt means is moving said camera mechanism, and said video switching means including microphone means, responsive to said certain noise, for detecting said certain noise and generating an electrical signal representative thereof; said electrical signal operably causing said video switching means to be said first video output while said certain noise is detected by said microphone means, and said electrical signal causing said video switching means to be said second video output while said certain noise is not detected by said microphone means.

12. The apparatus as recited in claim 11, in which said video switching means further comprises bandpass filtering means for bandpass filtering from said electrical signal noises that are dissimilar from said certain noise.

13. The apparatus as recited in claim 11, in which said video switching means further comprises delay means for causing said video switching means to be said first video output while said certain noise is detected by said microphone means and for a certain delay period thereafter.

14. A multi-camera programmable pan-and-tilt apparatus, said apparatus comprising:

(a) a base;

(b) a camera mechanism, said camera mechanism comprising:
   i. a first camera having a first video output; and
   ii. a second camera having a second video output and having a zoom magnification; said second camera including zoom means for varying the zoom magnification of said second camera;

(c) pan-and-tilt means for moving said camera mechanism with respect to said base;

(d) video switching means, receiving said first and said second video outputs, for selectively choosing one of said first and said second video outputs for output as a third video output; said third video output being selected by said video switching means to be said first video output while said pan-and-tilt means is moving said camera mechanism, and said third video output being selected by said video switching means to be said second video output while said pan-and-tilt means is not moving said camera mechanism; and (e) programmable control means for controlling said camera mechanism and said pan-and-tilt means; said control means having a plurality of programmably pre-set selected view positions; said zoom means being responsive to said control means;

said pan and tilt means emitting a certain noise only while said pan and tilt means is moving said camera mechanism, and said video switching means including microphone means, responsive to said certain noise, for detecting said certain noise and generating an electrical signal representative thereof; said electrical signal operably causing said video switching means to be said first video output while said certain noise is detected by said microphone means, and said electrical signal causing said video switching means to be said second video output while said certain noise is not detected by said microphone means; and said video switching means further comprises delay means for causing said video switching means to be said first video output while said certain noise is detected by said microphone means and for a certain delay period thereafter.

* * * * *